(12) United States Patent
Brown et al.

(10) Patent No.: US 9,856,160 B2
(45) Date of Patent: Jan. 2, 2018

(54) BIOLOGICAL TWO-STAGE CONTAMINATED WATER TREATMENT SYSTEM

(71) Applicant: Carollo Engineers, Inc., Sacramento, CA (US)

(72) Inventors: Jess C. Brown, Sarasota, FL (US); Christopher T. Cleveland, Sacramento, CA (US)

(73) Assignee: BIOTTTA LLC, Phoenix, AZ (US)

( * ) Notice: Subject to any disclaimer, the term of this patent is extended or adjusted under 35 U.S.C. 154(b) by 867 days.

(21) Appl. No.: 13/573,533

(22) Filed: Sep. 22, 2012

(65) Prior Publication Data
US 2014/0083934 A1    Mar. 27, 2014

(51) Int. Cl.
*C02F 1/72* (2006.01)
*C02F 3/28* (2006.01)
(Continued)

(52) U.S. Cl.
CPC ............. *C02F 1/722* (2013.01); *C02F 1/72* (2013.01); *C02F 3/006* (2013.01); *C02F 3/12* (2013.01);
(Continued)

(58) Field of Classification Search
CPC .. C02F 1/66; C02F 1/722; C02F 3/006; C02F 3/30; C02F 2101/16; C02F 2101/105;
(Continued)

(56) References Cited

U.S. PATENT DOCUMENTS 3,425,936 A * 2/1969 Cuip .................. C02F 3/12
                                              210/108
4,053,396 A * 10/1977 Trense ............... C02F 3/06
                                              210/618
(Continued)

FOREIGN PATENT DOCUMENTS

CN    101891356    * 11/2011 .............. C02F 9/14
DE    3902626      *  8/1990 .............. C02F 3/00
WO    0174471 A1     10/2001

OTHER PUBLICATIONS

Naidoo, et al., "Treated wastewater effluent as a source of microbial pollution of surface water resources", Int J Environ Res Public Health, 11(1): 249-270 (2014).*
(Continued)

*Primary Examiner* — Katherine Zalasky
*Assistant Examiner* — Benjamin Lebron
(74) *Attorney, Agent, or Firm* — The Webb Law Firm

(57) ABSTRACT

The systems may be used for treatment of water that contains contaminants. Water containing at least one of a nitrate, percholate, chromate, selenate and a volatile organic chemical is combined with nutrients and then is processed in an anoxic-anaerobic bioreactor. The combined effluent may also be oxygenated by dosing with hydrogen peroxide or liquid oxygen. The combined effluent of the bioreactor is dosed with a particle conditioning agent. The combined effluent treated water of the bioreactor is then filtered in a biofilter to produce a treated effluent stream. The influent water and combined effluent of the anoxic-anaerobic bioreactor may also be dosed with hydrogen peroxide to control biomass content in the system.

17 Claims, 1 Drawing Sheet

(51) Int. Cl.
*C02F 3/12* (2006.01)
*C02F 9/00* (2006.01)
*C02F 3/30* (2006.01)
*C02F 3/00* (2006.01)
*C02F 1/52* (2006.01)
C02F 101/10 (2006.01)
C02F 101/12 (2006.01)
C02F 101/16 (2006.01)
C02F 101/22 (2006.01)
C02F 101/32 (2006.01)
C02F 103/06 (2006.01)

(52) U.S. Cl.
CPC ............ *C02F 3/121* (2013.01); *C02F 3/28* (2013.01); *C02F 3/2806* (2013.01); *C02F 3/30* (2013.01); *C02F 9/00* (2013.01); *C02F 1/52* (2013.01); *C02F 3/1273* (2013.01); *C02F 3/2833* (2013.01); *C02F 3/302* (2013.01); *C02F 2003/001* (2013.01); *C02F 2003/003* (2013.01); *C02F 2101/106* (2013.01); *C02F 2101/12* (2013.01); *C02F 2101/163* (2013.01); *C02F 2101/22* (2013.01); *C02F 2101/322* (2013.01); *C02F 2103/06* (2013.01); *C02F 2209/001* (2013.01); *C02F 2209/003* (2013.01); *C02F 2209/03* (2013.01); *C02F 2209/11* (2013.01); *C02F 2209/15* (2013.01); *C02F 2209/22* (2013.01)

(58) Field of Classification Search
CPC .......... C02F 2101/322; C02F 2103/007; C02F 2103/06; C02F 2101/106; C02F 2101/163; C02F 2101/12; C02F 2101/36; C02F 2101/22; C02F 3/00; C02F 3/02; C02F 3/12; C02F 3/28; C02F 1/72; C02F 1/52; C02F 2003/001; C02F 2003/003; C02F 2209/001; C02F 2209/003; C02F 2209/03; C02F 2209/11; C02F 2209/15; C02F 2209/22; C02F 3/1273; C02F 3/121; C02F 3/2806; C02F 3/2833; C02F 3/302; C02F 9/00
See application file for complete search history.

(56) References Cited

U.S. PATENT DOCUMENTS

| | | | | |
|---|---|---|---|---|
| 4,255,266 A | * | 3/1981 | Moreaud | C02F 3/006 210/614 |
| 4,919,815 A | * | 4/1990 | Copa | C02F 3/085 210/603 |
| 5,372,720 A | * | 12/1994 | Jonsson | C02F 3/006 210/610 |
| 5,736,047 A | * | 4/1998 | Ngo | C02F 3/12 210/170.08 |
| 6,261,456 B1 | | 7/2001 | Yamasaki et al. | |
| 6,923,596 B2 | * | 8/2005 | Lessard | B09C 1/002 210/601 |
| 7,682,815 B2 | | 3/2010 | Guiot | |
| 7,943,041 B1 | * | 5/2011 | Standley | C02F 1/5245 210/195.1 |
| 2002/0139747 A1 | * | 10/2002 | Gantzer | C02F 3/00 210/605 |
| 2003/0047521 A1 | * | 3/2003 | McGinness | B01D 47/00 210/758 |
| 2005/0045557 A1 | * | 3/2005 | Daigger | C02F 3/1215 210/605 |
| 2005/0067356 A1 | * | 3/2005 | Bowman | B09C 1/002 405/128.5 |
| 2006/0060512 A1 | | 3/2006 | Astle et al. | |
| 2006/0124543 A1 | | 6/2006 | Pehrson et al. | |
| 2006/0292684 A1 | | 12/2006 | Bentley | |
| 2007/0102354 A1 | * | 5/2007 | Flournoy | C02F 3/006 210/614 |
| 2007/0114174 A1 | * | 5/2007 | Peeters | C02F 3/006 210/605 |
| 2007/0193950 A1 | * | 8/2007 | Brown | C02F 1/68 210/610 |
| 2008/0110828 A1 | * | 5/2008 | Yerushalmi | C02F 3/06 210/620 |
| 2009/0200231 A1 | * | 8/2009 | Walton | C02F 1/008 210/631 |
| 2009/0218280 A1 | | 9/2009 | Josse | |
| 2009/0283471 A1 | | 11/2009 | Tanaka et al. | |
| 2010/0044306 A1 | * | 2/2010 | Lo | B01J 19/126 210/631 |
| 2010/0089825 A1 | | 4/2010 | Canzano et al. | |
| 2010/0120104 A1 | * | 5/2010 | Reed | C12N 1/20 435/140 |
| 2010/0282654 A1 | * | 11/2010 | Hauschild | C02F 3/1268 210/151 |
| 2011/0017663 A1 | | 1/2011 | Raskin et al. | |

OTHER PUBLICATIONS

St. Johns River Water Management District, "Water pollution". Nov. 18, 2011.*

Houtmeyers, J., et al., "Hydrogen peroxide as a supplemental oxygen source for activated sludge: microbial investigations", European Journal of Applied Microbiology, 4, pp. 295-305 (1977).*

USP Technologies. "BOD and COD removal hydrogen peroxide (H2O2)". Web. Accessed May 11, 2017.*

2006 AWWA Inorganic Contaminants Workshop, Austin, TX, USA; "Biodenitrificaton: More than 20 years of experience at full scale,"; Authors, V. Bonnelye, et al.

Applied and Environmental Microbiology, Dec. 1991, pp. 3418-3422, Copyright 1991, American Society for Microbiology, vol. 57, No. 12, by Fathepure and Vogel.

* cited by examiner

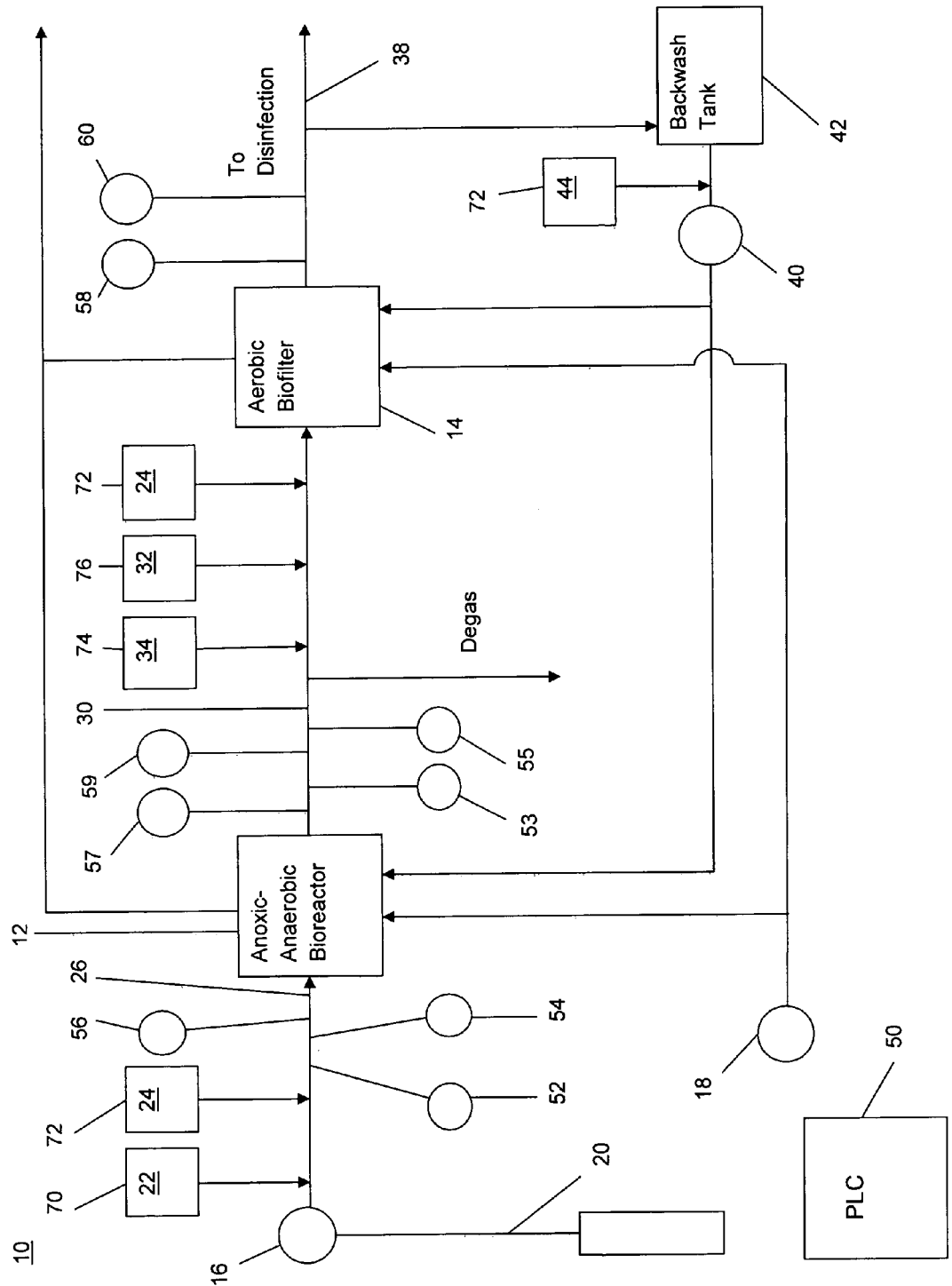

BIOLOGICAL TWO-STAGE CONTAMINATED WATER TREATMENT SYSTEM

BACKGROUND OF THE INVENTION

This invention relates to processes and systems for treatment of groundwater or surface water that contains at least one of the following contaminants: nitrate, perchlorate, chromate, selenate, and volatile organic chemicals such as perchloroethylene, trichloroethylene, dichloroethylene, vinyl chloride, trichloropropanol, dibromochloropropane, and carbon tetrachloride. The new method implements a second treatment stage aerobic biofilter in combination with a first stage anoxic/anaerobic bioreactor with interstage oxygenation and particle conditioning addition.

Raw drinking water sources may contain nitrate, perchlorate, chromate, selenate, and one or more of various volatile organic chemicals, for example, perchloroethylene, trichloroethylene, dichloroethlyene, vinyl chloride, trichloropropane, dibromochloropropane and carbon tetrachloride. There are numerous processes and technologies available for removing one or more of these contaminants from drinking water, including ion exchange, reverse osmosis, electrodialysis reversal, granular activated carbon adsorption, air stripping, and advanced oxidation. Each of these processes and technologies has one or more of the following disadvantages: exerts a high energy demand, exerts a high operational cost, generates of a high-strength concentrated waste stream that must be further treated or disposed, adds considerable salt to a given watershed, does not address all of the cited contaminants, is sensitive to raw water quality, and sensitive to operating conditions.

Various biological processes have also been tested and used to treat one or more of the cited contaminants. These processes are typically single stage biological reactors with upstream nutrient addition. These processes have one of more of the following disadvantages in that they: cannot treat all of the cited contaminants, produce excess biomass that can slough into the effluent of the bioreactor, can experience clogging due to the production of excessive extracellular polymeric substances, and can leak nutrients into the effluent, thereby causing biological regrowth potential and disinfection by-product formation potential.

Some processes may include an additional element with a particulate filter unit that may be sand, granular activated carbon, anthracite or similar media and may have a backwash system to reduce clogging and to fluidize the bioreactor bed. However, the filtration in these systems is for high rate particle filtration rather than for degrading and removing dissolved contaminants.

SUMMARY OF THE INVENTION

The present invention is directed to processes and systems for treatment of water that contains contaminants. Water containing at least one of a nitrate, percholate, chromate, selenate and a volatile organic chemical is combined with nutrients and then is processed in an anoxic-anaerobic bioreactor. The combined effluent of the bioreactor is dosed with a particle conditioning agent. The combined effluent may also be oxygenated by dosing with hydrogen peroxide or liquid oxygen. The combined effluent treated water of the bioreactor is then filtered in a biofilter to produce a treated effluent stream. The influent water and combined effluent of the anoxic-anaerobic bioreactor may also be dosed with hydrogen peroxide to control biomass content in the system.

These and other features, aspects and advantages of the present invention will become better understood with reference to the following drawings, description and claims.

BRIEF DESCRIPTION OF THE DRAWINGS

FIG. 1 illustrates a biological two-stage contaminated water treatment system according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIG. 1, a biological treatment system 10 for removing one or more contaminants from groundwater or surface water has a first stage bioreactor 12 and a second stage biofilter 14. The bioreactor 12 may be an anoxic-anaerobic bioreactor that receives influent raw drinking water 20 with nutrients 22 added. The nutrients 22 that may include acetic acid, ethanol, and glycerin as carbon source/ electron donors, phosphorus in the form of phosphoric acid, and nitrogen in the form of ammonia (e.g., liquid ammonium sulfate) may serve to achieve microbial degradation of water contaminants that may include nitrate, perchlorate, chromate, selenate, perchloroethylene, trichloroethlyene, trichloropropane, carbon tetrachloride, dibromochloropropane and other volatile organic chemicals. The dosing of the influent water with hydrogen peroxide 24 may limit biological clogging of the system 10.

The bioreactor 12 may be a suspended growth reactor, granular fixed-film reactor that is fixed-bed or fluidized bed, or membrane-based fixed-film reactors. The anoxic-anaerobic bioreactor 12 may degrade/remove nitrate, perchlorate, chromate, selenate, perchloroethylene, trichloroethylene, dichloroethylene, vinyl chloride, trichloropropanol, carbon tetrachloride, and other volatile organic chemicals.

After the dosed water influent stream 26 is treated across the bioreactor 12 the effluent treated water 30 may be dosed with oxygen 32 and dosed with a particle conditioning agent 34 in the interstage flow between the bioreactor 12 and the aerobic biofilter 14. The oxygenation 32 may be accomplished by dosing with hydrogen peroxide 24, liquid oxygen, by an aeration process such as fine-bubble diffusion or cascade aeration, or by an eduction process. The particle conditioning agent 34 dosing may be by use of a coagulant such as alum or ferric, or by use of a polymeric compound such as cationic polymer. The dosage of hydrogen peroxide 24 may be approximately 1 to 2 mg/L for biomass control and approximately 10 to 12 mg/L for oxygenation.

The effluent treated water 30 with added dosing in the interstage flow that may increase the oxidation-reduction potential of the water, release trapped nitrogen gas bubbles as necessary, and condition sloughed biomass is then processed in the aerobic biofilter 14. The aerobic biofilter 14 may be a granular media-based biofilter or a biologically active membrane filter. The aerobic biofilter 14 may degrade/remove remaining volatile organic chemicals, hydrogen sulfide, residual carbon nutrient, and sloughed biomass.

The system 10 control of biomass conditions in the anoxic-anaerobic bioreactor 12 and the aerobic biofilter 14 are important to the efficiency of removing the contaminants in the influent water 20 and in the effluent treated water 30.

The contaminants in the influent water 20, the nutrients 22 from nutrient dosing, and the constituents in the resulting effluent treated water 30 are further treated in the aerobic biofilter 14. The biomass conditions at each stage 12, 14 may be monitored for turbidity and pressure loss to measure slime, sloughing, clogging and the like conditions. The dosing of influent water 20 and effluent treated water 30 with hydrogen peroxide 24 serves to chemically scour biomass and unclog the bioreactor 12 and biofilter 14, and the conduit or piping for conducting fluids in the system 10. The hydrogen peroxide 24 may be dosed intermittently or continuously as controlled by a program logic control system 50. There may also be a backwash pump 40 and backwash tank 42 to control or minimize biomass in the system 10 to reduce biological clogging of the bioreactor 12 and biofilter 14.

The two-stage system 10 with a wide range in oxidation-reduction potential allows enhanced processing of the range of contaminants that can be degraded and removed. The destruction of multiple contaminants may be accomplished with reduced energy input and without producing high-volume, high-strength waste streams. The contaminant removal performance has been demonstrated in analysis to be typically independent of raw water quality. The treated effluent stream 38 of the system 10 also has minimal biomass.

Sensors and control devices may be used to monitor and control dosing at the various stages of the system 10. The dosed nutrients 22 concentration is a function of the dissolved oxygen and nitrate concentration in the raw drinking water 20. Oxygen analyzers 52, 53 and nitrate analyzers 54, 55 measure the dissolved oxygen and nitrate in the raw drinking water 20 and effluent treated water 30 and transmit the data to the program logic controller 50 that correlates the data to then transmit control signals to a nutrient 22 dosing unit 70 or feed pump to dose at a calculated concentration. Generally the program logic controller 50 will be programmed with a range of dissolved oxygen and nitrate that is desired in the effluent treated water 30 and when measured values are outside the ranges, the program logic controller 50 will adjust nutrients 22 dosing to correct the concentrations. This feed-forward, feed-backward nutrient 22 dose control 70 ensures that sufficient nutrients 22 are dosed to the system 10 while minimizing excess nutrients in the effluent treated water 30 of the anoxic-anaerobic bioreactor 12.

Pressure sensors 56, 57, 58 may be used to measure pressure drop between the influent drinking water 20 and the effluent treated water 30, and between the effluent treated water 30 and the treated effluent stream 38. Turbidity sensors 59, 60 may be used to measure turbidity of the effluent treated water 30 and treated effluent stream 38. The measurements may be transmitted to the program logic controller 50 for calculating biomass conditions at each stage 12, 14 to assess the slime growth, sloughing matter, clogging and the like that is detrimental to efficient system 10 operation. Based on the measurement data the program logic controller 50 will adjust the dosing of hydrogen peroxide 24 by control of a hydrogen peroxide dosing unit 72 in water flows 26, 30, and will control backwash pump 40 and air blower 18 to chemically scour and physical loosen and remove biomass accumulation in the system 10. The measurement data may also be used to control and adjust dosing of the particle conditioning agent 34 by a particle condition unit 74 and of the liquid oxygen 32 by an oxygen dosing unit 76.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for treatment of groundwater or surface water that contains contaminants comprising:
    dosing an influent groundwater or surface water stream containing at least one of a nitrate, perchlorate, chromate, selenate and a volatile organic chemical with nutrients and, after dosing the influent groundwater or surface water stream, processing the influent groundwater or surface water stream in an anoxic-anaerobic bioreactor;
    dosing an effluent treated water stream of said anoxic-anaerobic bioreactor with a particle conditioning agent;
    oxygenating said effluent treated water stream of said anoxic-anaerobic bioreactor;
    after dosing the effluent treated water stream with the particle conditioning agent and oxygenating the effluent treated water stream, filtering the effluent treated water stream in an aerobic biofilter to produce a treated effluent stream, wherein the aerobic biofilter is a granular media-based biofilter;
    dosing hydrogen peroxide to said influent groundwater or surface water stream to control biomass content;
    dosing hydrogen peroxide to said effluent treated water stream in the interstage flow between the anoxic-anaerobic bioreactor and the aerobic biofilter for oxygenation;
    measuring a nitrate concentration and dissolved oxygen concentration in the influent groundwater or surface water stream;
    measuring a nitrate concentration and dissolved oxygen concentration in the effluent treated water stream; and
    controlling, by a program logic controller, the dosing of the influent groundwater or surface water stream with nutrients based on the nitrate concentration and dissolved oxygen concentration in the influent groundwater or surface water stream and the effluent treated water stream.

2. The method as in claim 1 further comprising monitoring the pressure change and the turbidity in said anoxic-anaerobic bioreactor and in said aerobic biofilter for operation of a backwash pump to pump a fluid from a backwash tank to flow through said anoxic-anaerobic bioreactor and said aerobic biofilter to control biomass content.

3. The method as in claim 2 wherein said fluid is said treated effluent stream.

4. The method as in claim 3 wherein said fluid is dosed with hydrogen peroxide.

5. The method as in claim 1 wherein said nutrients are selected from the group consisting of organic carbon based electron donors, phosphorus and nitrogen.

6. The method as in claim 1 wherein said nutrients are acetic acid, phosphoric acid and liquid ammonium sulfate.

7. The method as in claim 1 wherein said anoxic-anaerobic bioreactor is selected from the group consisting of a suspended growth reactor and a fixed-film reactor.

8. The method as in claim 1 wherein said anoxic-anaerobic bioreactor is a fixed bed bioreactor with granular activated carbon for a biogrowth support medium.

9. The method as in claim 1 wherein oxygenating said effluent treated water stream comprises: dosing said effluent treated water stream with hydrogen peroxide; dosing said effluent treated water stream with liquid oxygen; fine bubble diffusion aeration of said effluent treated water stream;

cascade aeration of said effluent treated water stream; or eduction of said effluent treated water stream.

10. The method as in claim 1 wherein said particle conditioning agent is selected from the group consisting of a coagulant and a polymeric compound.

11. The method as in claim 1 wherein said particle conditioning agent is a cationic polymer.

12. The method as in claim 1 wherein said aerobic biofilter is a fixed-bed biofilter with dual media of sand and granular activated carbon.

13. The method as in claim 1 wherein said volatile organic chemicals comprising:
   at least one of perchloroethylene, trichloroethylene, trichloropropane, carbon tetrachloride, dichloroethylene, vinyl chloride, dichloropropane, dibromochloropropane.

14. The method as in claim 1 wherein the dosing of hydrogen peroxide is approximately 1 to 2 mg/L for biomass control and approximately 10 to 12 mg/L for oxygenation.

15. The method as in claim 1 further comprising monitoring the pressure change and the turbidity in said anoxic-anaerobic bioreactor and in said aerobic biofilter to control dosing of said influent groundwater or surface water stream and said effluent treated water stream with hydrogen peroxide.

16. The method of claim 1, wherein the influent groundwater or surface water stream is surface water.

17. The method of claim 1, wherein the influent groundwater or surface water stream is groundwater.

* * * * *